Figure 1:
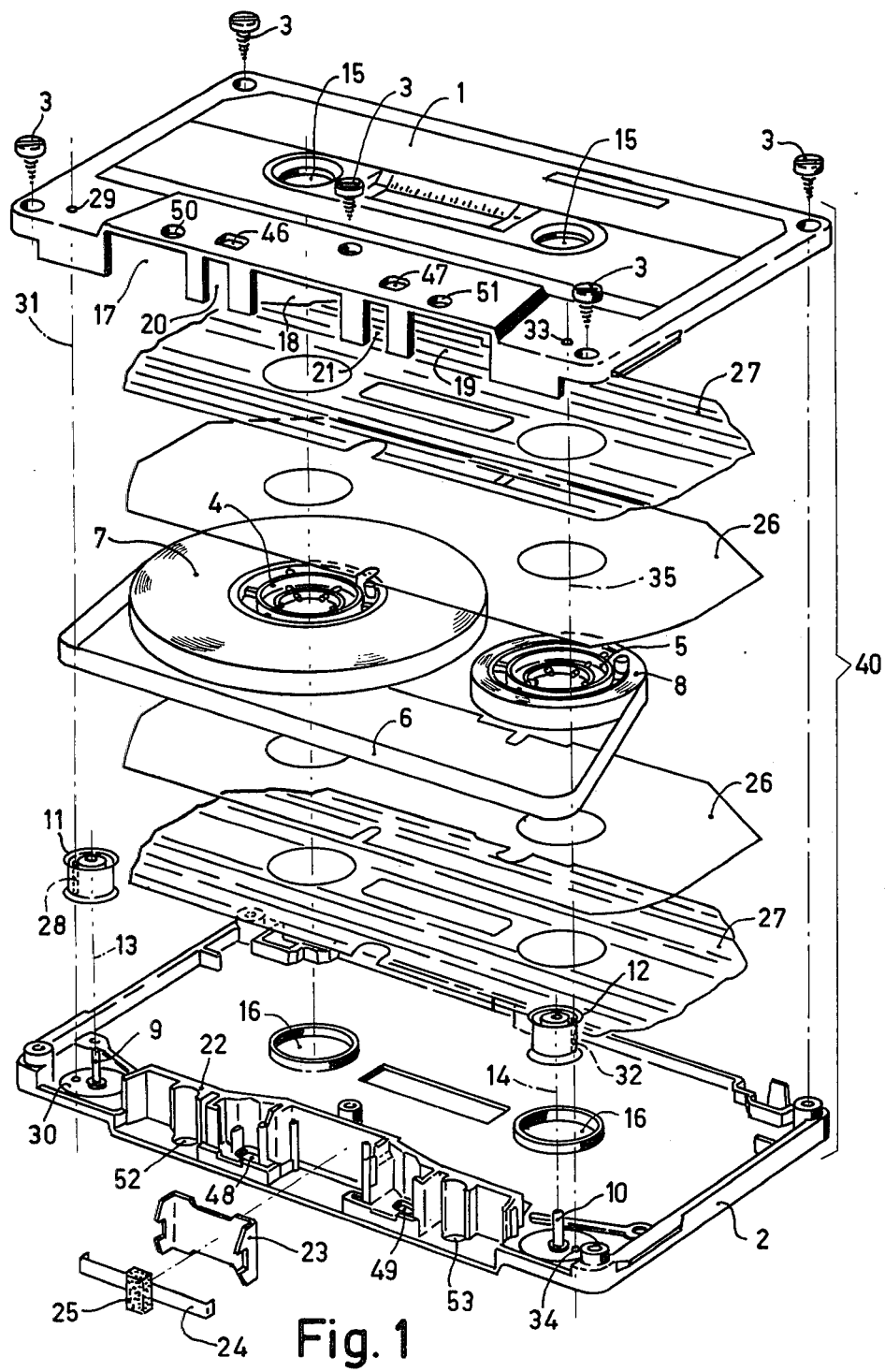

United States Patent [19]

Lavaleije

[11] 4,290,089
[45] Sep. 15, 1981

[54] MAGNETIC-TAPE CASSETTE WITH TAPE COUNTING ROLLER

[75] Inventor: Matheus D. Lavaleije, Eindhoven, Netherlands

[73] Assignee: U.S. Philips Corporation, New York, N.Y.

[21] Appl. No.: 965,830

[22] Filed: Dec. 4, 1978

[30] Foreign Application Priority Data

Dec. 12, 1977 [NL] Netherlands .......................... 7713709

[51] Int. Cl.³ ....................... G11B 15/18; G11B 15/48
[52] U.S. Cl. .................................... 360/72.1; 360/74.6
[58] Field of Search .................... 360/72.1, 137, 74.6; 33/129, 141 E

[56] References Cited

U.S. PATENT DOCUMENTS

| | | | |
|---|---|---|---|
| 3,037,290 | 6/1962 | Dolby | 33/129 |
| 3,728,685 | 4/1973 | Stalnert | 360/72.1 |
| 3,739,276 | 6/1973 | Dornberger | 33/129 |
| 3,820,101 | 6/1974 | Bolick | 360/137 |
| 4,001,552 | 1/1977 | Muller | 360/137 |
| 4,167,787 | 9/1979 | Satoh | 360/137 |
| 4,172,231 | 10/1979 | d'Alayer de Costemore | 360/137 |

FOREIGN PATENT DOCUMENTS

| | | | |
|---|---|---|---|
| 2740824 | 10/1977 | Fed. Rep. of Germany | 360/72.1 |
| 2250182 | 5/1975 | France | |
| 2286468 | 4/1976 | France | |

*Primary Examiner*—Vincent P. Canney
*Attorney, Agent, or Firm*—Thomas A. Briody; David R. Treacy

[57] ABSTRACT

A magnetic tape transport system with a magnetic tape cassette is provided with a tape transport measuring device which comprises a rotary pulse device which cooperates with a light source and a light-sensitive cell, the pulse device being rotated during transport of the magnetic tape and the number of pulses detected by the photo-cell being counted and displayed with the aid of a read-out device, such as a digital display device. In order to obtain a correct linear relationship between the length of tape which has been transported and the number of counted pulses, a tape guide roller in the cassette is used as pulse device, the cassette housing locally being provided with a light-transmitting portion, such as openings or transparent portions.

3 Claims, 8 Drawing Figures

MAGNETIC-TAPE CASSETTE WITH TAPE COUNTING ROLLER

This invention relates to a magnetic-tape transport system, which comprises: a magnetic-tape cassette which comprises a housing which accommodates a first and a second winding hub, a length of magnetic tape with a first end connected to the first winding hub and with a second end connected to the second winding hub, so as to enable it to be wound from the first winding hub to a reel on the second winding hub, and back from the second winding hub to a reel on the first winding hub, and at least one tape guide roller which is rotatable about an axis of rotation by the magnetic-tape, for guiding the magnetic tape during its transport from the one reel to the other reel; a tape drive for the transport of the magnetic tape in the cassette from the one reel to the other reel; as well as a tape transport measuring device for measuring and indicating the length of magnetic tape transported between the reels and comprising a radiation source for the generation of a radiation beam, a radiation sensitive electrical element in the path of the radiation beam and a pulse device which cooperates with the radiation beam, which is disposed in the path of the radiation beam between the radiation source and the radiation-sensitive element and which is rotatable about an axis of rotation by the tape drive device, which pulse device is provided with means for during rotation varying the exposure of the radiation-sensitive element by the radiation beam alternately between a maximum and a minimum, so as to vary an electrical property of the radiation-sensitive element between a maximum and a minimum.

Such a magnetic-tape transport system, employed in a cassette recorder for use in conjunction with standard cassettes, the so-called "Compact Cassettes", is known from U.S. Pat. No. 3,820,101. The tape drive means for the transport of the magnetic tape in the cassette comprises two winding spindles which cooperate with the two winding hubs. One of these winding spindles drives a pulse device via a belt, which device consists of a disc in which apertures are formed. A radiation source in the form of an incandescent lamp is arranged on the one side of the disc and a radiation-sensitive element in the form of a phototransistor on the other side. During the rotation of the disc the phototransistor is periodically exposed to the light beam emitted by the lamp. The variations in the voltage at the output of the phototransistor are counted with the aid of an electronic counting circuit. The number of pulses counted by the electronic circuit is a measure of the transported length of magnetic tape.

A disadvantage of this known system and of similar magnetic tape transport systems is the fact that the re-lationship between the transported length of tape and the number of counted pulses is non-linear. This is because the reel diameter changes during unwinding or winding, so that there is no constant relationship between the number of pulses per revolution of the pulse device and the length of magnetic tape which is transported per revolution of a reel. It is an object of the invention to provide a magnetic-tape transport system in which there is a linear relationship between the number of variations between a maximum and a minimum value of the property of the radiation-sensitive element and the length of magnetic tape which has been tranported. According to the invention a magnetic-tape transport system of the type mentioned in the preamble is characterized in that the pulse device is constituted by (one of) the tape guide roller(s) in the cassette and the cassette housing is locally provided with (a) radiation-transmitting part(s) allowing the passage of the radiation beam into the interior of the cassette for the purpose of cooperation with the tape guide roller(s) serving as pulse device.

Thus, it is characteristic of the invention that a tape guide roller, which is driven by the magnetic tape itself, is used as pulse device. As a result of this an excellent linearity between the measured number of variations in the electrical property of the radiation-sensitive element and the length of magnetic tape which has been transported can be achieved. Measuring the transported length of tape is effected directly at the location where the magnetic tape is transported without the intervention of further movement-imparting components.

One embodiment of the invention is characterized in that each tape guide roller serving as pulse device has at least one through-bore at some distance from and parallel to its axis of rotation for the periodic passage of said beam of radiation during its rotation. A further embodiment of the invention is characterized in that for periodically reflecting the radiation beam during its rotation each tape guide roller serving as pulse device has at least one axial end provided with a first portion and a second portion with radiation-reflecting properties which differ from each other.

When an opening in the cassette housing for the passage of the radiation beam is undesirable, it is advantageous to use an embodiment which is characterized in that said radiation-transmitting part of the housing of the manetic tape cassette consists of a transparent part of the housing.

An embodiment of a magnetic-tape tranport system in which the tape-transport measuring device utilizes radiation reflection is characterized in that for periodically reflecting the radiation beam during its rotation each tape guide roller which serves as pulse device comprises a substantially cylindrical side face, provided with a first and a second portion with radiation-reflecting properties which differ from each other.

The invention is also assumed to relate to cassettes, more in particular to the well-known "Compact Cassettes", suitable for a magnetic tape transport system in accordance with the invention as described hereinbefore. Furthermore, the invention is assumed to relate to a magnetic tape recording and/or playback equipment provided with a magnetic tape transport system in accordance with the invention.

Figure 2:
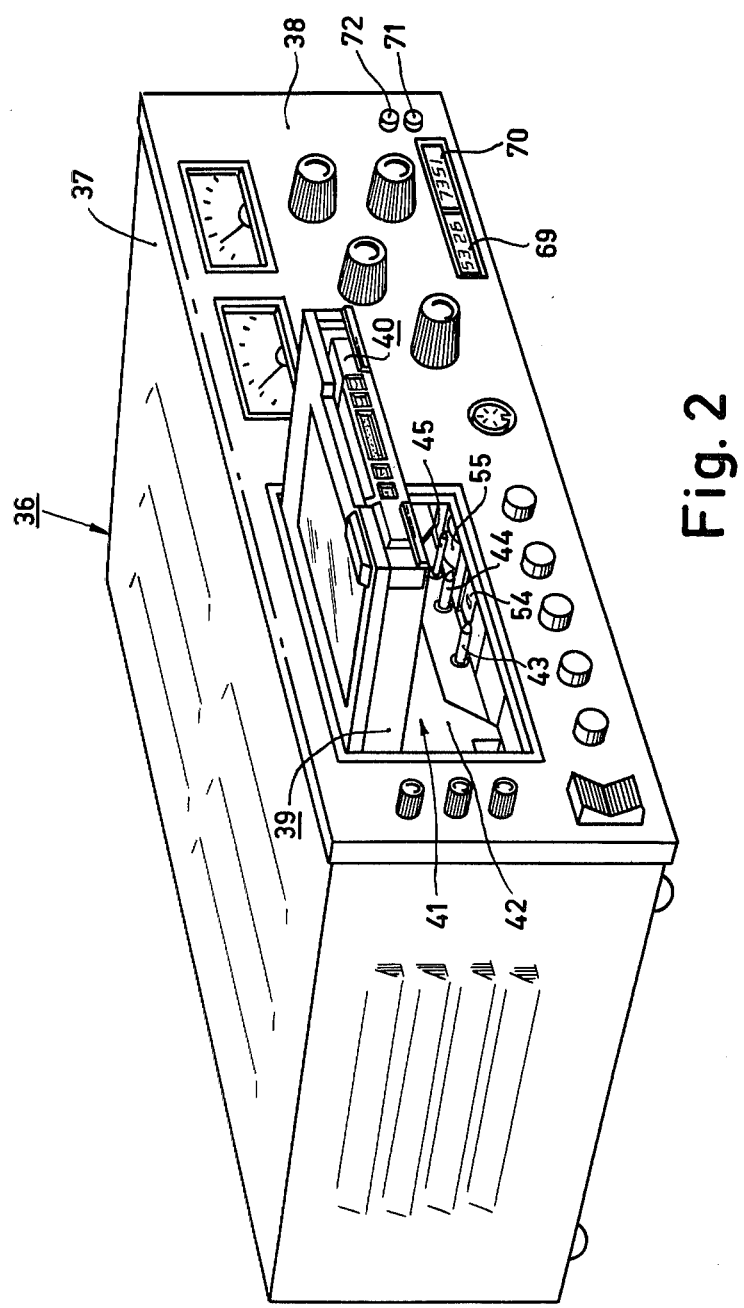
Figure 3:
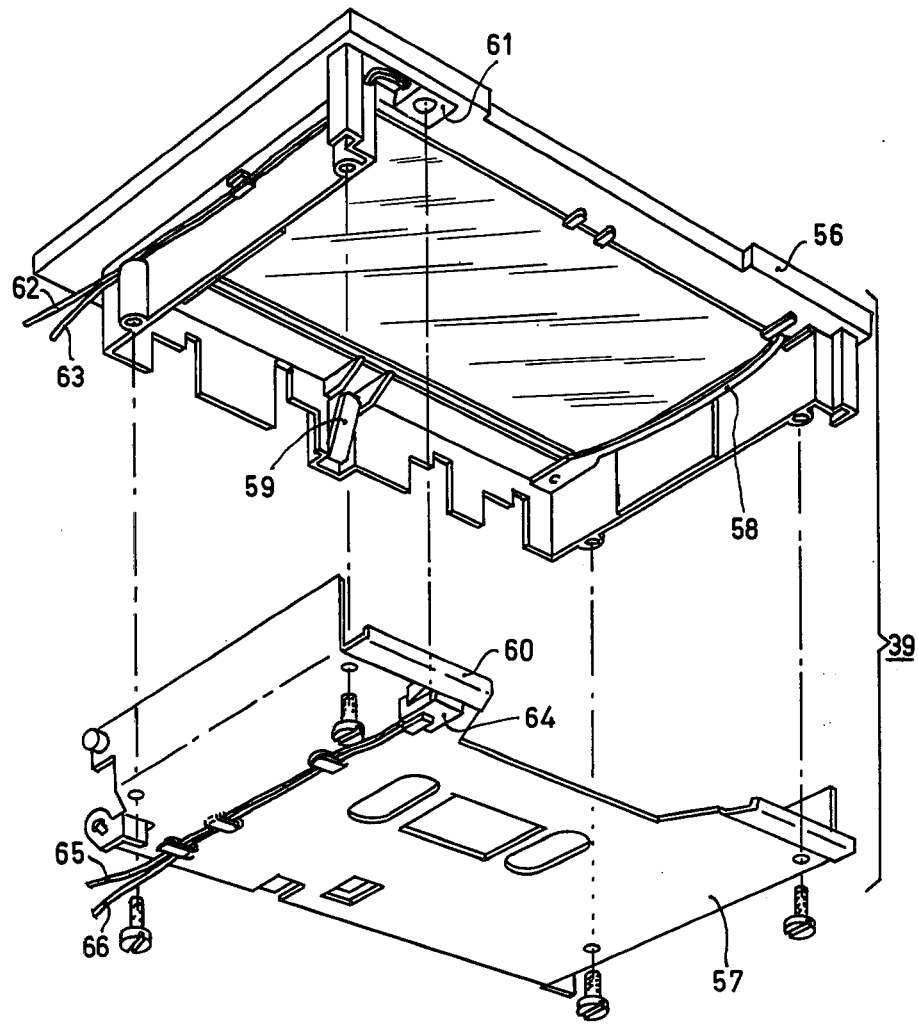
Figure 4:
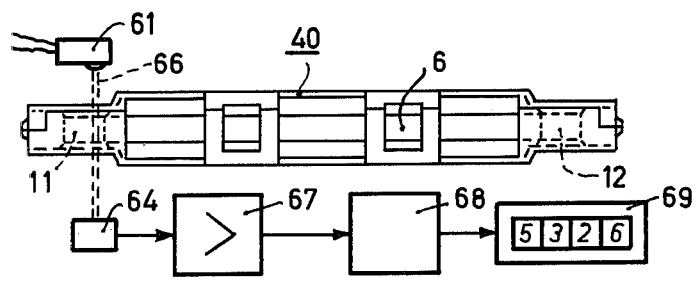
Figure 5:
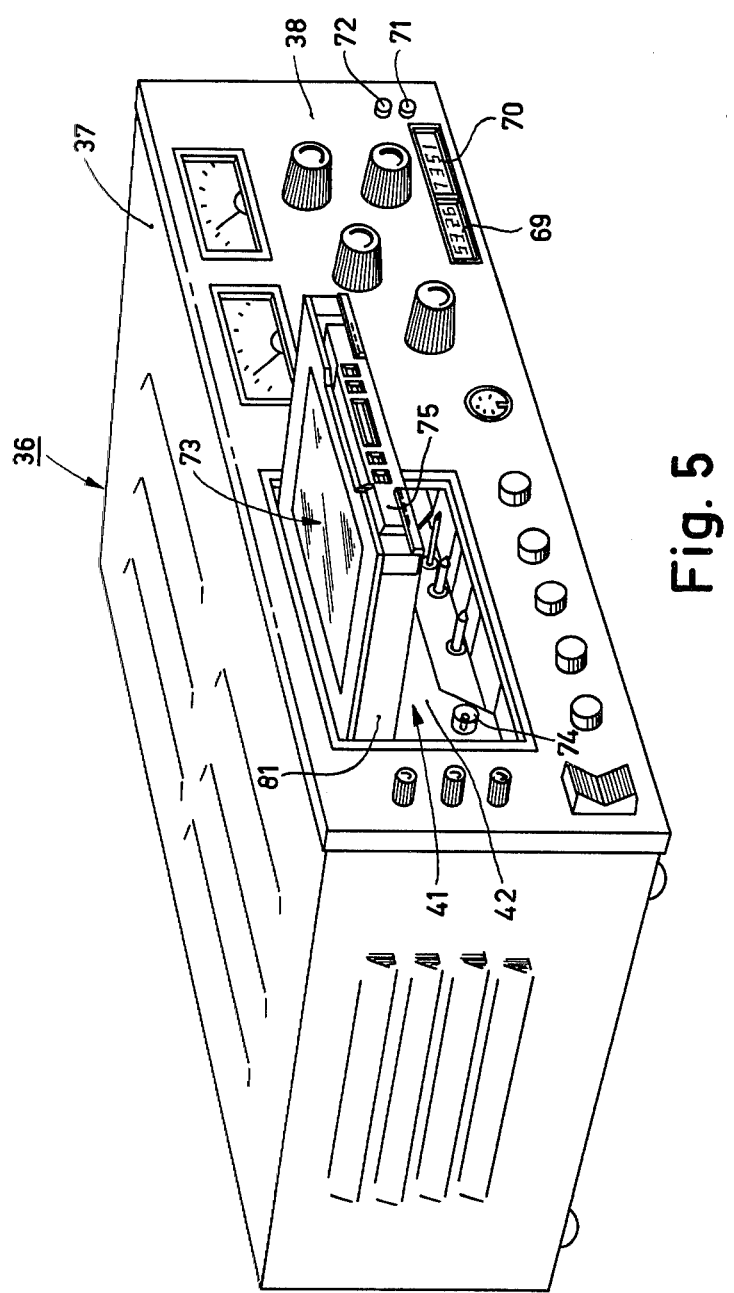

The invention will now be described in more detail with reference to the drawing, in which:

FIG. 1 is an exploded view of a Compact Cassette, in which the tape guide rollers and the housing have throughgoing apertures for the passage of a light beam for a tape-transport measuring device, FIG. 2 shows a magnetic tape recording apparatus provided with a magnetic tape transport device employing a cassette in accordance with FIG. 1, FIG. 3 shows a cassette holder of the magnetic tape recording apparatus in accordance with FIG. 2, provided with a lamp and a phototransistor for cooperation with the cassette in accordance with FIG. 1, FIG. 4 schematically illustrates the principle of the magnetic tape cassette in accordance with FIG. 1 used in the magnetic tape recording apparatus in accordance with FIG. 2, FIG. 5 shows a magnetic-tape recording apparatus equipped with a magnetic tape transport system in which a tape-transport measuring device employs a reflected light beam.

Figure 6:
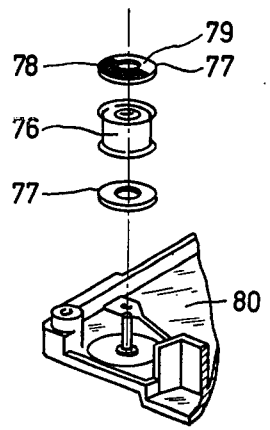
Figure 7:
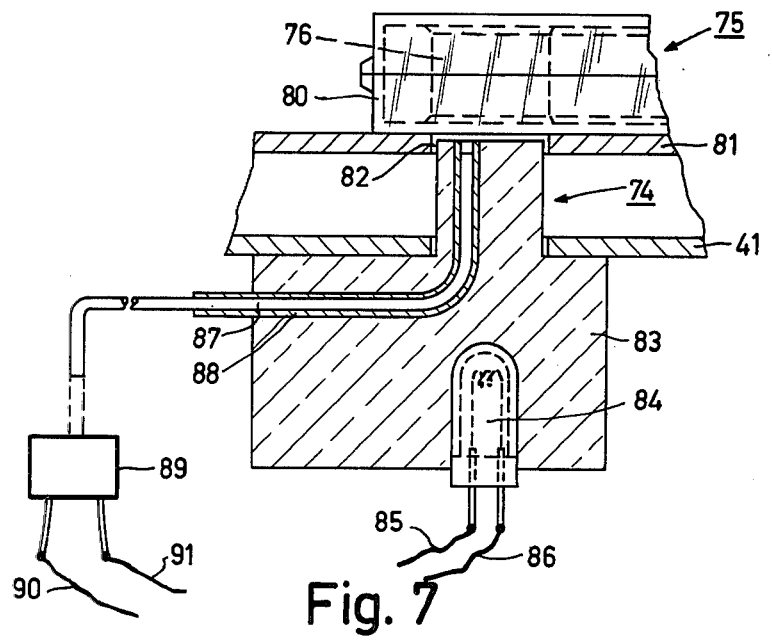
Figure 8:
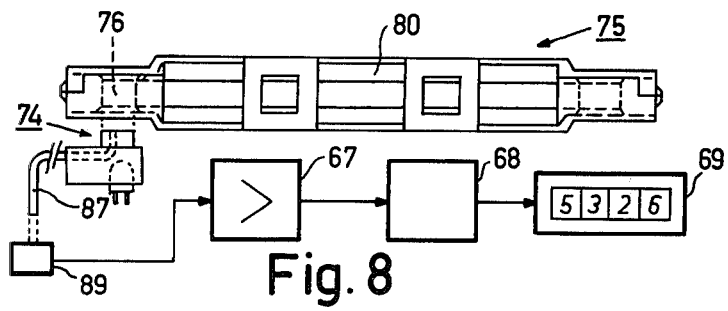

FIG. 6 shows a modification of a Compact Cassette in accordance with FIG. 1 for use in the magnetic tape recording apparatus in accordance with FIG. 5, FIG. 7 on an enlarged scale shows a detail of the magnetic tape recording apparatus in accordance with FIG. 5, and FIG. 8 shows the principle of a cassette modified in accordance with FIG. 6 used in the magnetic tape recording apparatus in accordance with FIG. 5.

The magnetic tape cassette (40) in accordance with FIG. 1 is a so-called Compact Cassette. It comprises a housing consisting of a top cover 1 and a bottom cover 2, which can be secured with the aid of five screws 3. The housing accommodates two winding hubs 4 and 5. The magnetic tape 6 is connected to the winding hub 4 with its one end and to the winding hub 5 with its other end. The greater length of the magnetic tape 6 is contained on a reel 7 which is wound onto the winding hub 4 and a smaller length is contained on the reel 8 which is wound onto the winding hub 5. By rotation of the winding hubs 4 and 5 the magnetic tape from the one winding hub can be wound to a reel on the other winding hub. The bottom cover 2 is provided with two pins 9 and 10, on which two tape guide rollers 11 and 12 can be mounted for rotation. The axes of rotation of the tape guide rollers 11 and 12 are designated 13 and 14 respectively. The top cover 1 has two openings 15 and the lower cover 2 has two openings 16. These openings serve for the passage of drive spindles which are adapted to cooperate with the winding hubs 4 and 5. The front of the top cover 1 has a number of openings 17 through 21 for the passage of means of a magnetic tape recording apparatus which cooperate with a magnetic tape, such as a recording/playback head, a pressure roller, an erase head, etc. The bottom cover 2 is provided with an upright stationary tape guide 22 along which the magnetic tape 6 is guided on its way from the tape guide roller 11 to the tape guide roller 12. In the tape guide 22 a mu-metal screening bracket 23 and a phosphor-bronze spring 24 provided with a pressure felt 25 are mounted for shielding magnetic fields from a recording/playback head and pressing the magnetic tape against such a head respectively. Between the reels 7 and 8 and the top cover and the bottom cover two flat foils 26 and two undulated foils 27 are inserted for resiliently exerting pressure on and axially guiding the reels 7 and 8 in the correct manner.

The tape guide roller 11 serves as pulse device and for allowing a radiation beam to pass periodically during its rotation it has a through-bore 28 at some distance from and parallel to its axis of rotation 13. The top cover 1 and the bottom cover 2 have corresponding openings 29 and 30. These openings are in such a position relative to each other and at such a distance from the axis of rotation 13 of the tape guide roller 11, that in a specific position, see FIG. 1, a radiation beam which is incident on the magnetic tape cassette in the direction of the axis 31 is allowed to pass through the opening 29 and subsequently through the through-bore 28 and the opening 30 to the other side of the cassette. In a similar way the tape guide roller 12 has a through-bore 32, the top cover 1 and the bottom cover 2 having corresponding openings 33 and 34, so that a radiation beam can also pass through the cassette in accordance with an axis 35.

FIG. 2 shows a magnetic tape recording and playback apparatus 36, a so-called cassette recorder, of the vertical type. It is provided with a casing 37 as well as a front panel 38 on which a number of usual control and indication elements are provided, which are not designated by reference numerals. In the front panel 38 a hinged cassette holder 39 is mounted, in which a cassette 40 has been inserted of the type shown in exploded view in FIG. 1. In FIGS. 1, 2 and 4 corresponding parts of the cassette bear corresponding reference numerals. The cassette holder 39 can be moved through a 90° angle in such a way that it is almost completely accommodated in a recess 41 in the recorder. This recess has a bottom 42 through which two locating pins 43 and 44 project, as well as a capstan 45. The cassette 40 (see FIG. 1) has openings 46 and 47 in the top cover 1 and corresponding openings 48 and 49 in the bottom cover 2 for the passage of locating pins and furthermore it has corresponding openings 50 through 53 for the passage of a capstan in the top cover and the bottom cover respectively. Two winding spindles which pass through the bottom 42 and which are adapted to cooperate with the winding hubs of the cassette 40 are not visible in FIG. 2. These winding spindles as well as the capstan 44 are driven by means of one or more electric motors in the interior of the cassette recorder 36 and belong to the tape drive device for the transport of the magnetic tape in the cassette 40 from the one reel to the other reel. This tape drive device is not shown in more detail, but may be of any type such as used in commercially available cassette recorders. After closure of the cassete holder 39 a magnetic head 54 as well as a pressure roller 55 are moved towards the interior of the cassette 40. The pressure roller 55 cooperates with the magnetic tape in known manner and presses said tape against the cylindrical outer surface of the capstan 45.

FIG. 3 shows the cassette holder 39 in exploded view; it comprises two parts 56 and 57. On each side in the part 56 a leaf spring 58 is disposed each of which one spring is visible, for pressing the cassette in the direction of the part 57. At the rear of the part 56 there is located a leaf spring 59 which presses a cassette forwards against a ridge 60 of the lower part 57. A cassette inserted in the cassette holder 39 is so positioned relative to the part 57 by said springs, that it assumes a comparatively well-defined position in the cassette holder. In the upper part 56 a light source 61 is mounted, which receives its voltage supply by means of two wires 62 and 63. Opposite the light source 61 a phototransistor 64 is mounted in the part 57, before an opening in the lower half 57 (not visible in the drawing). The phototransistor is provided with two wires 65 and 66 for connection to an electronic circuit which processes the output signal. The light source 61 and the phototransistor 64 are arranged at such a location that they can suitably cooperate with the through-bore in the tape guide rollers of the cassette 40 and with the corresponding openings in the housing. This cooperation is further illustrated by means of FIG. 4. The light source 61 emits a light beam 66, which is incident on the phototransistor 64 once per revolution of the tape guide roller 11. The pulsating volatage which is supplied by the phototransistor 64 is applied to an amplifier 67. The output signal of the amplifier is applied to an electronic circuit 68 which counts the pulses from the phototransistor and converts them into suitable signals for a mechanically driven or an electronic digital display unit 69 which is provided with illuminated digits or liquid crystals. The number displayed by the digital display unt 69, which in the present embodiment has four digits at the most, is a measure of the length of magnetic tape which has been wound from reel 7 onto the reel 8.

The digital display unit 69 is located at the front of the cassette recorder (see FIG. 2) next to a second digital display unit 70. This digital display unit can also display a number consisting of four digits, which number can be set with the aid of two buttons 71 and 72. The cassette recorder is equipped with such a circuit arrangement that when the numbers displayed by the digital display units 69 and 70 are the same the cassette recorder is automatically turned off.

FIG. 5 one more shows the cassette recorder 36 but now equipped with a modified cassette holder 73 and a modified tape transport measuring device. This device is adapted for use of a reflected light beam instead of a transmitted light beam. Through the bottom 42 of the recess 41 a measuring probe 64 has been passed, also see FIG. 7. The cassette holder 73 contains a cassette 75 which is substantially identical to the cassette 40 of FIG. 1. The modifications of the cassette relate to the construction of the guide rollers, and of the top and the bottom cover. FIG. 6 shows how the guide roller 11 and the bottom cover 2 have been modified in comparison with FIG. 1. The guide roller 11 has been replaced by a guide roller 76 which is not provided, at least need not be provided, with a throughgoing bore. On both sides of the tape guide roller a disc 77 is arranged. Each of said discs is provided with a first and a second portion 78 and 79 respectively, having different light-reflecting properties. For example, the portion 78 may be black and the portion 79 white. The lower cover 80 has no openings for the passage of a light beam but is integrally manufactured from a transparent plastic. Obviously, this may be applied to the cassette 40 in accordance with FIG. 1. Still another possibility is to make a cassette only locally transparent, for example with the aid of a transparent insert.

The method of cooperation of the measuring probe 74 with the cassette 75 when the cassette holder 73 is closed is shown in FIG. 7. In the lower half 81 of the cassette holder 73 an opening 82 is formed having a cross-section which is slightly greater than that of the measuring probe 74. The measuring probe consists of a transparent plastics body 83, whose upper part extends to near the cassette 75. In the transparent body 83 a lamp 84 is mounted, which can be energized via two wires 85 and 86. In a slot in the transparent body 83 a curve plastics wire 87 is fitted, which is surrounded by an opaque shell 88. The plastics wire 87 consists of a transparent material and serves as a light guide. The amount of light which is guided through the transparent wire 87 depends on the reflecting properties of the portion of the axial end of the tape guide roller 76 which is disposed above the end of the wire 87. If the portion 78 of the lower disc 77 is located above the end of the light guide 87, less light will transmitted by the light guide than when the white surface 79 is at this location. The light transmitted via the light guide 87 is used for exposure of a phototransistor 89 at a suitable location in the cassette recorder, which transistor can be connected to a suitable electronic circuit via the wires 90 and 91. As is shown in FIG. 8 the same electronic circuitry can be used for processing the signals from the phototransistor 89 as in the cassette recorder in accordance with FIG. 2, also see FIG. 4.

Instead of the axial end of the tape guide roller 76 it is also possible to use the cylindrical surface of the tape guide roller for reflecting the radiation beam and thus measuring the number of revolutions of the tape guide roller and consequently the transported length of magnetic tape. This embodiment is not shown in the drawing. However, it can emply a modification of the measuring probe 74, the measuring probe portion which projects from the bottom 42 of the recess 41 of the cassette recorder having a smaller diameter and the cassette having an opening for the passage of the measuring probe into the interior of the cassette, next to the tape guide roller. The upper end of the measuring probe should then be modified in such a way that the light is incident on the cylindrical side face of the tape guide roller in a lateral direction and the reflected light can be picked up by the light guide, for example by means of an oblique reflecting surface. It is assumed that a further description of this embodiment is not necessary after the comprehensive description of the preceding embodiment.

For suitable electronic circuits for the electronic section of the magnetic tape transport measuring device, reference is made to the manuals available from manufacturers of electronic components.

What is claimed is:

1. A magnetic-tape cassette comprising a housing, first and second winding hubs accommodated in the housing, a length of magnetic tape having a first end connected to the first winding hub and a second end conneoted to the second winding hub and arranged so that the tape can be wound back and forth between said hubs, and a tape guide roller arranged interiorly of said housing for guiding the magnetic tape being wound between said hubs, said roller being rotatable about an axis of rotation by the motion of the magnetic tape, and the improvement wherein said roller includes means for periodically varying the reflection or transmission of a radition beam impinging on the roller, responsive to rotation of the roller proportional to the transport of tape between said hubs, and the cassette housing comprises radiation transmitting parts arranged to allow passage of a radiation beam into and from the interior of the cassette for cooperation with said roller means.

2. A cassette as claimed in claim 1, wherein said roller means comprises at least one through bore spaced from and parallel to said axis of rotation to permit periodic transmission of a radiation beam impinging locally on the roller.

3. A cassette as claimed in claim 1, wherein said roller includes at least one axial end having first and second portions, said first and second portions having radiation-reflecting properties which differ from each other, and said radiation transmitting parts consist of a portion of the housing formed of a transparent material.

* * * * *